United States Patent
Lee (10) Patent No.: US 10,204,338 B2
(45) Date of Patent: Feb. 12, 2019

(54) SYNCHRONIZING CONTENTS OF REMOVABLE STORAGE DEVICES WITH A MULTIMEDIA NETWORK

(75) Inventor: Victor S. Lee, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 2772 days.

(21) Appl. No.: 10/997,418

(22) Filed: Nov. 24, 2004

(65) Prior Publication Data

US 2006/0112018 A1  May 25, 2006

(51) Int. Cl.
| | |
|---|---|
| G06Q 20/36 | (2012.01) |
| H04L 12/28 | (2006.01) |
| H04L 29/12 | (2006.01) |
| H04N 21/41 | (2011.01) |
| H04N 21/436 | (2011.01) |
| H04N 21/442 | (2011.01) |
| H04N 21/458 | (2011.01) |
| H04L 29/08 | (2006.01) |

(52) U.S. Cl.
CPC ..... *G06Q 20/3674* (2013.01); *H04L 12/2803* (2013.01); *H04L 12/2812* (2013.01); *H04L 29/12132* (2013.01); *H04L 61/1552* (2013.01); *H04L 67/327* (2013.01); *H04N 21/4135* (2013.01); *H04N 21/43615* (2013.01); *H04N 21/44231* (2013.01); *H04N 21/4586* (2013.01)

(58) Field of Classification Search
CPC .................................. G06Q 20/3674
USPC .......................................... 705/59
See application file for complete search history.

(56) References Cited

U.S. PATENT DOCUMENTS

| | | | |
|---|---|---|---|
| 5,629,980 A * | 5/1997 | Stefik ..................... | G06F 21/10 |
| | | | 705/54 |
| 5,671,412 A * | 9/1997 | Christiano | |
| 6,260,040 B1 * | 7/2001 | Kauffman ......... | G06F 17/30067 |
| 6,341,291 B1 * | 1/2002 | Bentley ............. | G06F 17/30126 |
| 6,697,948 B1 * | 2/2004 | Rabin et al. ..................... | 726/30 |
| 7,382,405 B2 * | 6/2008 | Kusaka ............. | H04N 1/00281 |
| | | | 348/231.6 |
| 2003/0014333 A1 * | 1/2003 | Brown .............. | G06F 17/30017 |
| | | | 705/28 |

(Continued)

OTHER PUBLICATIONS

Tokmakoff, et al., "Home Media Server Content Managment", Proceedings of SPIE, vol. 4519, 2001, pp. 168-179.

(Continued)

*Primary Examiner* — Calvin L Hewitt, II
*Assistant Examiner* — Cristina Owen Sherr
(74) *Attorney, Agent, or Firm* — Arent Fox LLP (57) ABSTRACT

Methods, systems, and engines are presented for synchronizing contents of removable storage devices with a multimedia network. In one implementation, a change in status of a connection between a removable storage device and a multimedia network is detected. A network inventory list of recordings is updated, triggered by the change in connection status. A change in the recording content, associated metadata, or digital rights of a recording may also trigger an update of the network inventory list. A network scheduler can use the updated network inventory list to accurately reflect those recordings actually available to the multimedia network for playback and recording, or available to an unauthorized user for purchase, including the recordings on removable storage devices.

28 Claims, 6 Drawing Sheets

(56) References Cited

U.S. PATENT DOCUMENTS

| | | |
|---|---|---|
| 2003/0046437 A1 | 3/2003 | Eytchison et al. |
| 2004/0003288 A1 | 1/2004 | Wiseman et al. |
| 2004/0117429 A1 | 6/2004 | Karaoguz et al. |
| 2004/0117822 A1 | 6/2004 | Karaoguz et al. |
| 2004/0117845 A1 | 6/2004 | Karaoguz et al. |
| 2004/0139173 A1 | 7/2004 | Karaoguz et al. |

OTHER PUBLICATIONS

European Search Report for European Application No. EP05111157, dated Aug. 6, 2007, 8 pgs.

The Canadian Office Action dated Jul. 18, 2013 for Canadian patent application No. 2527491, a counterpart foreign application of U.S. Appl. No. 10/997,418, 5 pages.

Translated Indian Office Action dated Nov. 17, 2014 for Indian patent application No. 3112/DEL/2005, a counterpart foreign application of U.S. Appl. No. 10/997,418, 1 page.

"First Office Action Issued in Canadian Patent Application No. 2855277", dated Mar. 24, 2015, 4 Pages.

\* cited by examiner

SYNCHRONIZING CONTENTS OF REMOVABLE STORAGE DEVICES WITH A MULTIMEDIA NETWORK

Two sets of extensible markup language (XML) text file listings used in accordance with the subject matter are provided in two appendices after the abstract on four sheets of paper and incorporated by reference into the specification. The XML text file listings include an exemplary schema for uploading a local inventory list of recordings to be reconciled with a network inventory list, and an exemplary schema for uploading recording metadata to be reconciled with a network inventory list and/or a network store of metadata. Each sample schema uses a simple object access protocol (SOAP) request and binding method.

TECHNICAL FIELD

The subject matter relates generally to multimedia networks and more specifically to synchronizing contents of removable storage devices with a multimedia network.

BACKGROUND

Multimedia networks include home entertainment networks that connect personal computing devices, digital video recorders (DVRs), and television sets to a centralized content server. Multimedia networks also include subscription multimedia services that provide digital video recording (DVR) capability through set top boxes.

In these conventional types of multimedia networks, the network server is best suited for maintaining the inventory as well as tracking the availability of recorded programs. This is because a server, e.g., of a commercial service, is the nerve center of the network, i.e., the "brain" that in many circumstances possesses the most reliable and authoritative information. Moreover, the central server typically stores or at least sends the multimedia content to the peripheral client nodes of the multimedia network.

In many multimedia networks, client nodes, such as local set top boxes and personal computers, increasingly have the capability to connect with removable storage devices. A removable storage device may consist of, for example, a solid-state flash drive or a hard drive mounted in a chassis. A firewire or a universal serial bus (USB) cable and jack is usually included with the removable storage device for plugging into a USB port of a set-top box or computing device. This makes it easy for a user to store recordings on the removable device and then unplug the device for portability. The removable storage device is portable to other systems that can alter the number of stored recordings or alter the recordings themselves, including their metadata.

A user may add recordings to a removable storage device without the changes being detected by a particular multimedia network. The user may also swap removable drives with others, etc. Thus, an inventory of recordings kept by a central server of a multimedia network is likely to be dated and cannot be trusted, when removable storage devices are in play. A way is needed for multimedia networks to track recordings and their metadata on removable storage devices.

SUMMARY

Methods, systems, and engines are presented for synchronizing contents of removable storage devices with a multimedia network. In one implementation, a change in status of a connection between a removable storage device and a multimedia network is detected. A network inventory list of recordings is updated, triggered by the change in connection status. A change in the recording content, associated metadata, encryption, and/or authorization level needed to access a recording may also trigger an update of the network inventory list. Further, a user may manually select an update of the inventory list. A network scheduler can use the updated network inventory list to accurately reflect those recordings actually available to the multimedia network for playback and recording, including the recordings on removable storage devices.

DETAILED DESCRIPTION

Overview

Client nodes on a multimedia network can operate removable storage devices that contain digitally recorded program files (herein referred to as "recordings"). Problems may arise for a multimedia network when users modify the recordings on the removable storage devices when the removable storage devices are not attached to the multimedia network. Likewise, problems arise when digital rights are needed to access a recording, and either the digital rights requirement changes or the recording is made newly available to a network where not all the users possess the digital rights.

The subject matter described herein provides methods, systems, and engines that can track the state of a digital recording for the benefit of a multimedia network based on a variety of changes to the recording, to the recording's metadata, to a level of authorization needed to access the recording, to the recording's encryption, or to the recording's environment on a removable storage device, etc. In one implementation, a recording identifier, such as a 16-bit or 32-bit globally unique identifier (GUID) is assigned to each recording. The state of each recording as it exists on a particular removable storage device can be discerned by a client node of the multimedia network and synchronized via the GUID to a network inventory list maintained at a home media server or maintained at a hub of a subscription media service.

In one implementation, the GUID is securely associated with its corresponding recording via a digital rights management schema. Thus, a GUID may be encrypted along with the content of a recording or the GUID may be encrypted with a recording's metadata. Further, a GUID or a copy thereof may be encrypted with a recording's metadata in order to verify another copy of the GUID stored elsewhere. These security measures for a recording's GUID can allow a client in possession of an encrypted recording to detect and list the recording for the benefit of itself and for a network, but do not allow an unauthorized user with malicious intent to detect the recording, decrypt the recording, and/or gain access to the GUID embedded in a recording via encryption for purposes of altering or removing the GUID.

The term "server" will be used herein to refer to a home network server, a multimedia network hub, or to a source of multimedia content in a subscription media service. In general, a "server" usually includes programming and/or digital video recording scheduler that provides a playback schedule for the entire multimedia network.

Exemplary Systems

Figure 1:
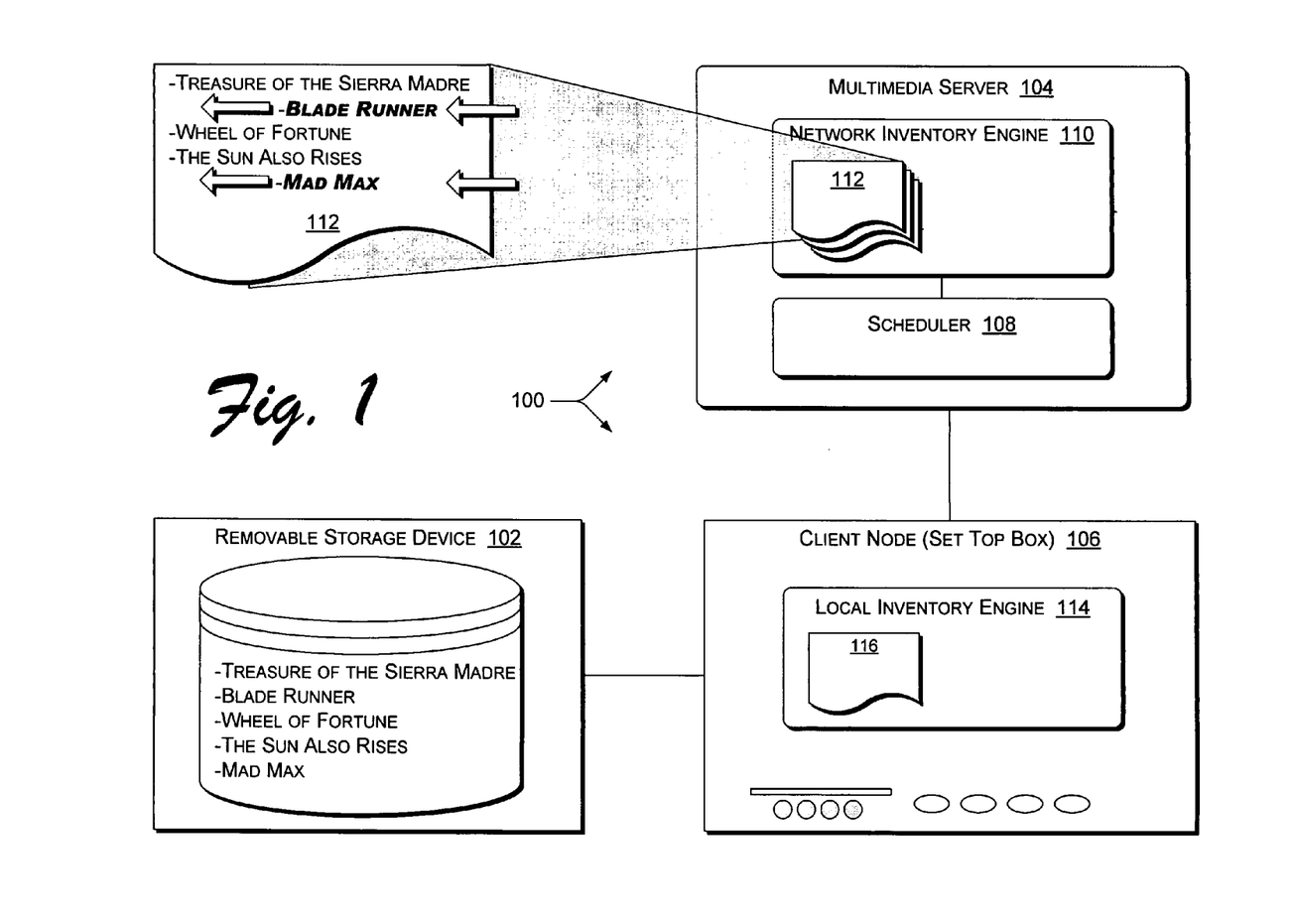
FIG. 1 is a graphic representation of an exemplary multimedia network for synchronizing contents of removable storage devices with a multimedia network.

FIG. 1 shows an exemplary multimedia network 100 for synchronizing contents of a removable storage device 102 with the multimedia network 100. A multimedia server 104 is connected with a client node 106, in this case a set top box, that is capable of connecting and disconnecting with the removable storage device 102. The removable storage device 102 may be, for example, a solid-state flash drive, or a hard drive mounted in a chassis with a firewire or universal serial bus (USB) cable and jack for plugging into a USB port of a set-top box 106 or computing device.

In order to support a network-based DVR environment, an exemplary central scheduler 108 of the subscription service and/or multimedia network 100 is assisted by accurate and up-to-date knowledge of recordings that have previously been made and their availability status. Accordingly, a network inventory engine 110 that may include or be associated with the scheduler 108, resides in the multimedia server 104, or elsewhere on the multimedia network 100, to keep an up-to-date network inventory list 112 of recordings that have a relationship with the multimedia network 100. The network inventory list 112 may typically include an availability (or unavailability) status for each recording.

The network inventory list 112 may also include or have access to metadata for each recording, such as electronic program guide (EPG) information and/or metadata that inform applications and other resources how to render or remotely manage the multimedia device and/or a recording. In addition, the network inventory list 112 may include, as part of the metadata for particular recordings, license keys that control whether or not the recording can be accessed. Thus, the exemplary multimedia network 100 may include digital rights managers, to be discussed more fully below. The digital rights managers may decide which clients are authorized to receive the license keys to access particular recordings. The digital rights managers may also allocate a certain number of the license keys and no more, in case the digital rights allow the recording to be accessed a limited number or times, or for a limited time.

Alternatively, the metadata may be stored elsewhere than the network inventory list 112 but may still be addressable by the network inventory list 112 via pointers, such as the GUIDs of the recordings.

Figure 3:
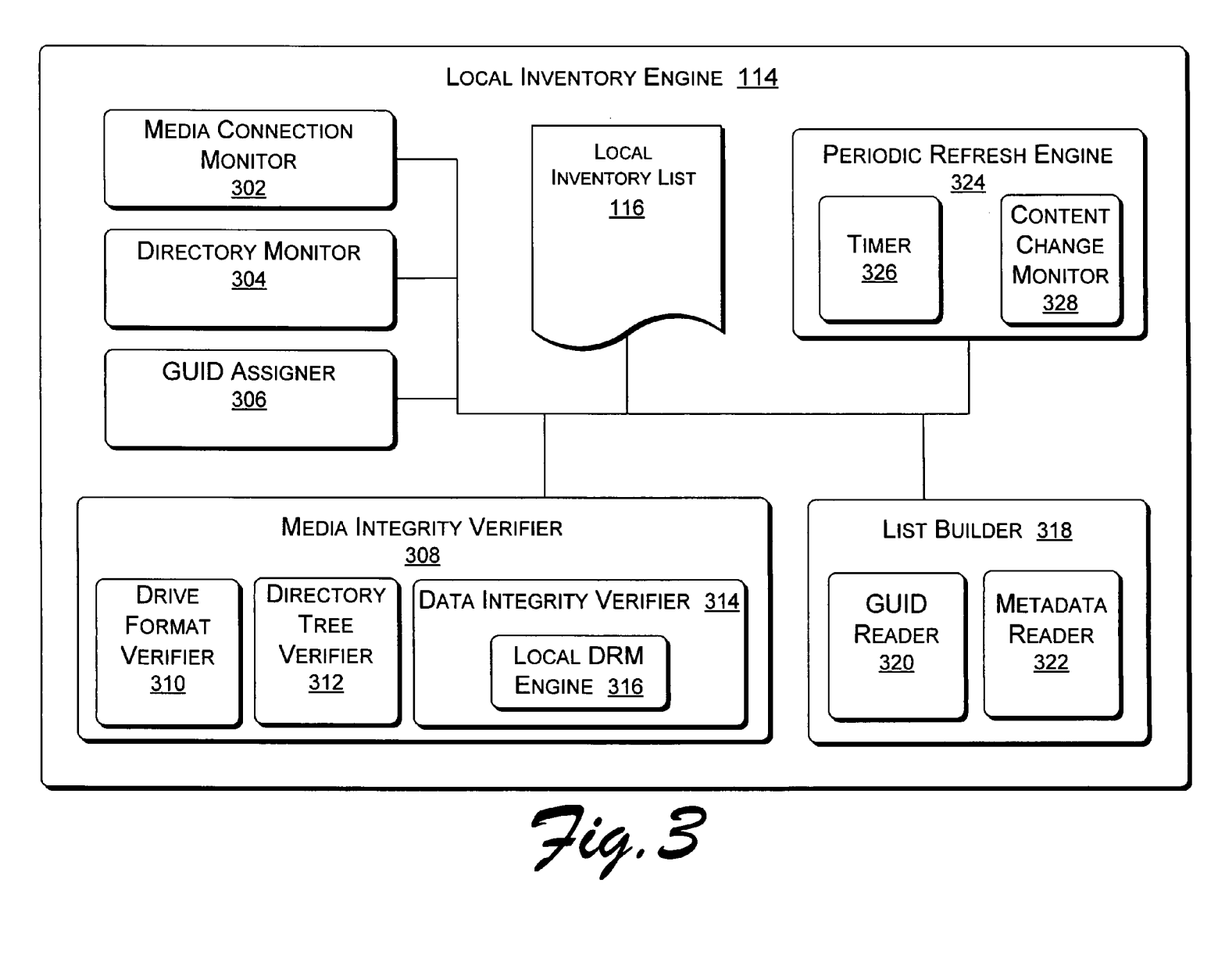
FIG. 3 is a block diagram of an exemplary local inventory engine.
Figure 4:
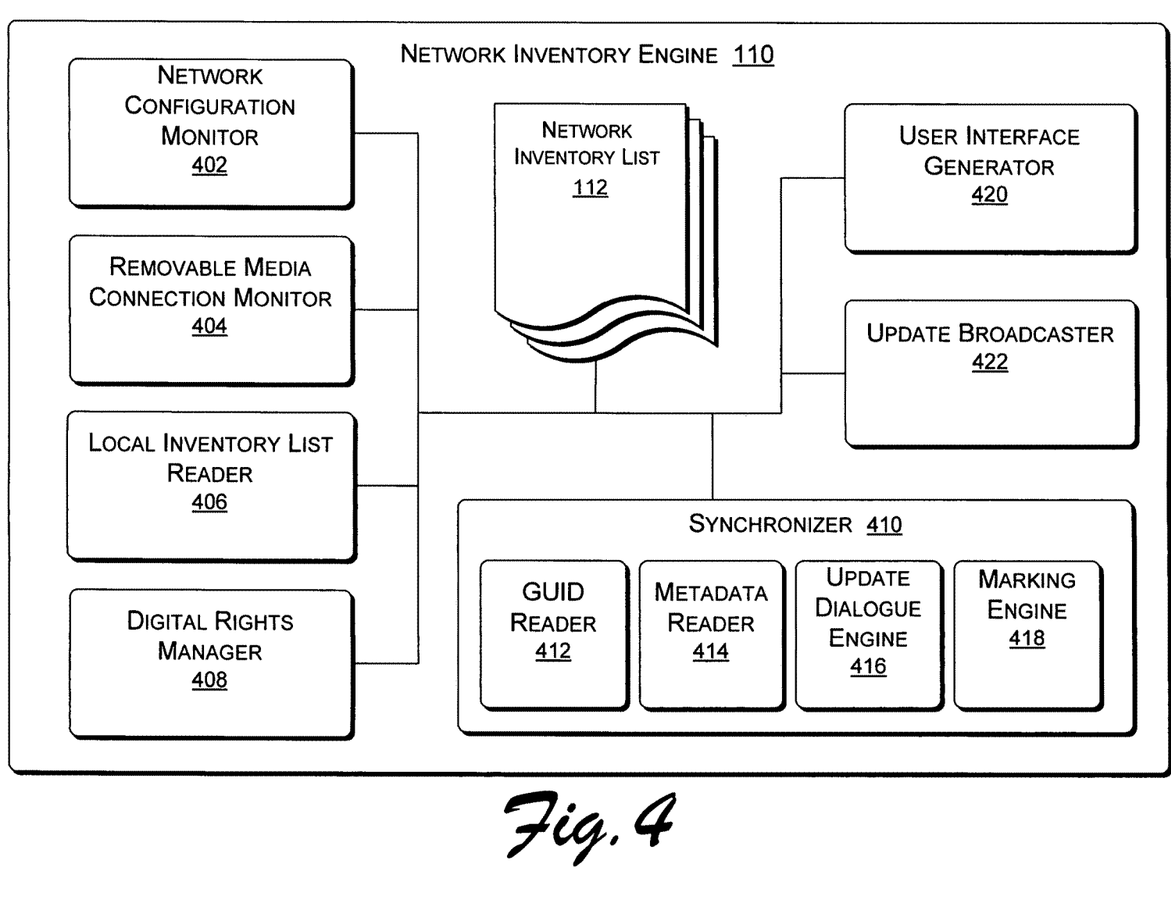
FIG. 4 is a block diagram of an exemplary network inventory engine.

In one implementation, a client node 106, that is, the illustrated set top box 106, includes a local inventory engine 114 that maintains a local inventory list 116 of recordings. It should be noted that the illustrated multimedia network 100 that has both a network inventory engine 110 and one or more local inventory engines (e.g., 114) is only one example configuration of the subject matter. In other implementations of the subject matter, all the functions of a local inventory engine 114 may be included in a network inventory engine 110, or in some other configuration of engines. Likewise, components of a network inventory engine 110 and a local inventory engine 114 may be distributed between the two engines in a manner that differs from an exemplary distribution of components that is illustrated in FIGS. 3 and 4.

The aforementioned local inventory list 116 provides a list of recordings currently available on a respective local client node 106, such as the set top box 106. The local inventory engine 114 maintains the local inventory list 116 by detecting changes in recordings and their metadata, and particularly by detecting when a removable storage device 102 containing the recordings and their metadata becomes connected or disconnected from the set top box 106.

Depending on the implementation, either a local inventory engine 114 detects the existence of current recordings on a removable storage device 102 and builds a local inventory list 116 to embody the detected recordings and metadata, or, a network inventory engine 110 detects the existence of the recordings without the intervention of a local inventory engine 114. The detection of actual recordings on the removable storage device 102 connected to a client node 106 or connected in some other manner to the multimedia network 100 is given priority over a pre-existing network inventory list 112 during reconciliation ("synchronization") between actual recordings on a removable storage device 102 and the network inventory list 112, which may have become dated.

If recordings that were not previously present to the network are newly detected on a removable storage device 102, for example, the illustrated "Blade Runner" and "Mad Max," then the multimedia server 104 assigns identifying GUIDs to the recordings and to associated metadata stored with the recordings. The GUIDs can be used to efficiently store and track the recordings and metadata and to update the network inventory list 112, as shown; as well as inform applications (e.g., recommendation engines, scheduling engines) of the updated information.

Figure 2:
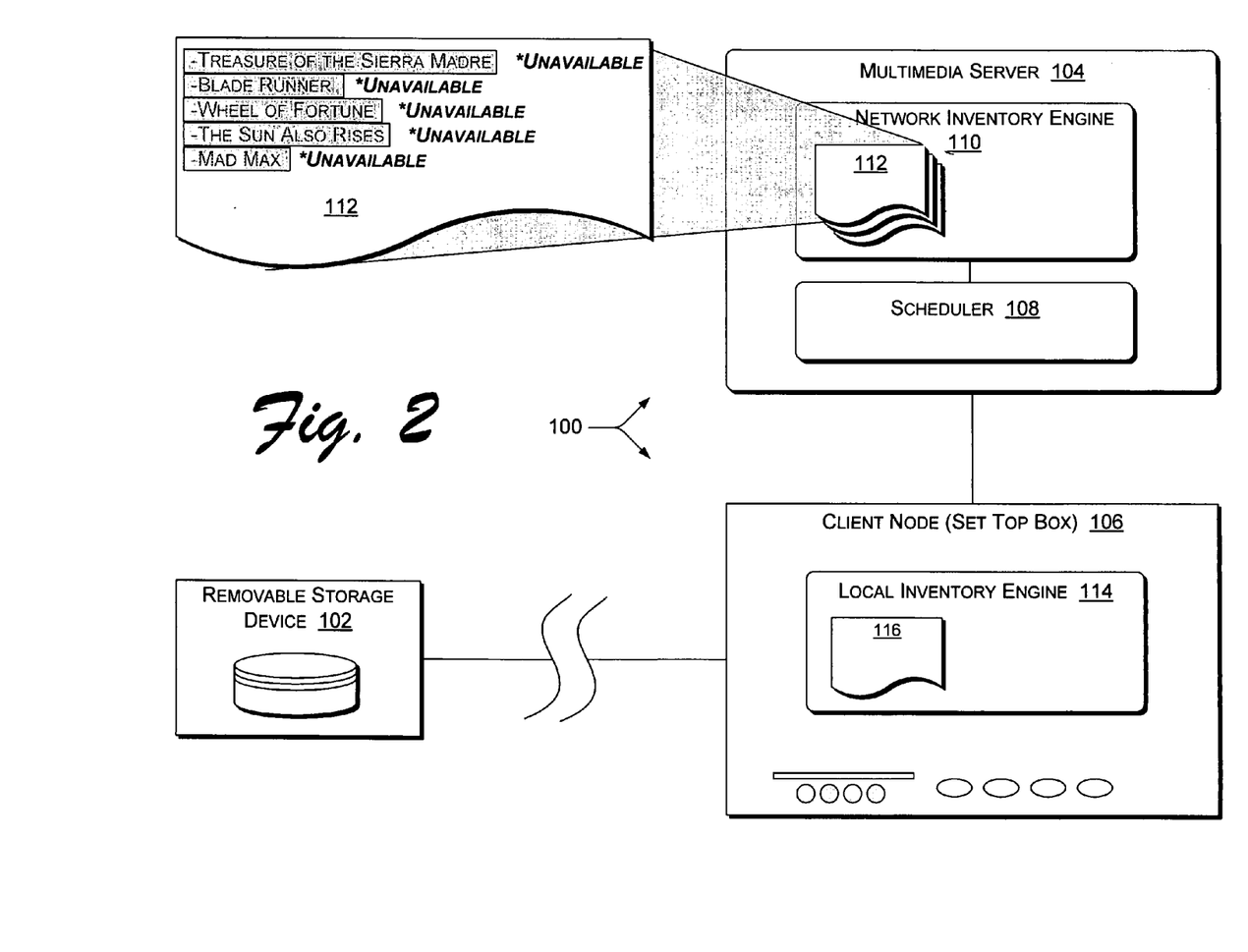
FIG. 2 is a graphic representation of an exemplary multimedia network for synchronizing contents of removable storage devices with a multimedia network in which recordings on a disconnected storage device are listed as unavailable.

As shown in FIG. 2, when one or more recordings are missing, as when a removable storage device 102 is disconnected from a set top box, instead of changing a status of the missing recordings to "deleted," the network inventory engine 110 changes their status in the network inventory list 112 to "unavailable", "potentially available," or "previously recorded but unavailable," etc., because the multimedia server 104 does not know what actually happened to the recording. Likewise, when the removable storage device 102 is reconnected (not shown in FIG. 2), the network inventory list 112 accessed by the network inventory engine 110 is updated and changes the status of the recordings back to available.

If a recording is subject to digital rights management, the network inventory engine 110 may change the status of a recording from unavailable to a conditional availability, upon reconnection of the removable storage device 102 containing the secured recording. In one implementation, for users that do not have digital rights to access a recording, the name of the unauthorized recordings may not be displayed to those clients. In another implementation, a recording that is subject to digital rights management is flagged and when displayed to clients without authorization, the clients are offered an opportunity to procure or purchase a license to access the recording.

Exemplary Inventory Engines

FIG. 3 shows an exemplary local inventory engine 114 for building a local inventory list 116, which can be uploaded or transferred to a multimedia server 104 for synchronization with a network inventory list 112. It should be noted that some implementations of the subject matter do not have an exemplary local inventory engine 114, but instead may combine functions of the local inventory engine 114 with the network inventory engine 110 to be discussed below with respect to FIG. 4. An exemplary local inventory engine 114 may be implemented in software, hardware, or combinations of hardware, software, firmware, etc. The configuration of an exemplary local inventory engine 114 illustrated in FIG. 3 is only meant to be one example configuration.

An exemplary local inventory engine 114 typically resides on a set top box, personal computing device, or other client node 106 of a multimedia network 100. An exemplary local inventory engine 114 typically inventories recordings and associated information on the local device on which the local inventory engine 114 resides. Thus, an exemplary local inventory engine 114 may have a media connection monitor 302 to detect a connection state (or disconnection state) of one or more removable storage devices 102 that are capable of connecting to the local client node 106. A directory monitor 304 may be included to detect changes within recording file directories on a removable storage device 102. A GUID assigner 306 assigns a unique identifier to each recording, for reliable tracking.

A media integrity verifier 308 performs a check-up on a newly connected removable storage device 102. Thus, the media integrity verifier 308 may include a drive format verifier 310, a file structure or "directory tree" verifier 312, and a data integrity verifier 314. Alternatively, some implementations of the subject matter may test only for the existence of a recording, and do not perform a data integrity test to determine if a recording file is corrupted, incomplete, or incorrectly identified. Some implementations may use a self-verifying data structure for recording metadata (e.g., EPG data) to detect incorrectness or incompleteness in metadata entries.

In one implementation, the data integrity verifier 314 includes a local digital rights management (DRM) engine 316. The local DRM engine 316 can detect encrypted recordings and/or whether recordings are subject to DRM, and can flag secured recordings for further processing on a server 104 of the multimedia network 100. In one implementation, the local DRM engine 316 is capable of determining a level of authorization that a prospective client on the network 100 will be required to possess in order to access the secured recording. In a variation, recordings subject to DRM may also be flagged by the local DRM engine 316 for free distribution across the network 100, but actual access by a client only if the client possesses or purchases a license. That is, the secured recordings may be flagged in order to offer unauthorized users a chance to purchase a license to access the recordings. In one implementation, the local DRM engine 316 includes decryption keys (for accessing secured recordings) in the metadata to be uploaded to the network when a network inventory list 112 is updated. The network 100 can then serve the decryption keys to clients according to the digital rights possessed by the clients.

A list builder 318 may include a GUID reader 320 and a metadata reader 322 to create the local inventory list 116. In some implementations, metadata for each recording is also updated when the network inventory list 112 is updated. The list builder 318 aims to create a current inventory of recordings currently available to the local client node 106 hosting the local inventory engine 114, particularly those recordings that reside on removable storage devices 102.

A periodic refresh engine 324 may be included to create a new or updated local inventory list 116 at predetermined time intervals, and therefore includes a timer 326. The refresh time interval may be based on input from a content change monitor 328, which detects changes in a file directory of the recordings (much like the directory monitory 304), thus, a best time interval for periodically refreshing the local inventory list 116 may be based, e.g., on a history of past time intervals between relevant changes in a directory. Alternatively, the periodic refresh engine 324 may default to triggering an update of the local inventory list 116 only when a removable storage device 102 is newly connected to the local client node 106 or only when a data content of a recording changes on a connected removable storage device 102.

The media connection monitor 302 may trigger an update of the local inventory list 116 if a removable storage device 102 is coming online at the local client node 106, e.g., set top box. Likewise the directory monitor 304 may trigger an update of the local inventory list 116 if monitored directories signal that some contents have changed, as mentioned.

As noted above, the GUID assigner 306 gives each unique recording a unique identification number. The assigned GUID allows a recording to be differentiated from other recordings regardless of where the recording resides. Thus, a recording can be identified even if it is moved or traded to different removable storage devices 102.

The assigned GUID is used to match up various entries about a recording in an exemplary local inventory list 116 and in an exemplary network inventory list 112. If a recording disappears, then a human identifier, such as a program name, that corresponds to the same GUID as that of the missing recording can be flagged as unavailable in the (server's) network inventory list 112 and in a user interface. If the missing recording reappears, then the status can be changed back to "available."

Recordings can move between devices or appear on multiple devices due to users manually sharing recordings. The ability to track recordings by a GUID facilitates tracking as the GUID may move between devices but not the data content of the recording itself.

In one implementation, the media integrity verifier 308 checks if a newly connected removable storage device 102 is formatted, and then examines a particular location (e.g., a file path, directory path, and/or subdirectories) where recordings and respective metadata, each identified by a GUID, are expected to be found. Directories may also be named with the GUIDs. As mentioned, some implementations check only for existence or presence of a recording while other implementations perform a more in-depth integrity check of the recording's digital file and/or the removable storage device 102 on which it resides.

The list builder 318 creates or updates a local inventory list 116 of recordings currently available to a set top box or other client node 106 at which one or more removable storage devices 102 can be connected. For example, a set top box may cache a local inventory list 116 in memory and perform maintenance on the list whenever the media connection monitor 302 or the directory monitor 304 detect a change. Alternatively, the list builder 318 may refresh the local inventory list 116 as triggered by the periodic refresh engine 324, described above. Even further, a refresh can be triggered explicitly by user action or if certain tasks are performed, such as moving or deleting a recording from a displayed list of recordings in a user interface.

When a local inventory list 116 has been newly created or newly updated through maintenance or refreshing, logic built into the fabric of the local inventory engine 114 may cause the local inventory list 116 to be uploaded to the network inventory engine 110 for synchronization with the network inventory list 112. The local inventory list 116, since it contains the most current information and metadata about recordings actually available to a client node 106 and/or removable storage device 102 associated with the client node 106, takes priority during synchronization over a pre-existing network inventory list 112.

In one implementation, a local inventory engine 114 uploads a local inventory list 116 associated with a client node of a multimedia network 100 to an Internet website associated with a multimedia server 104, for example, via a URL such as MediaServiceNetwork.com (intended to be a fictional sample URL name). In some implementations the network scheduler 108 is an XML web service. One implementation uses an extensible markup language (XML) vehicle for the upload. Appendix A, for example, shows a sample schema for an upload in which the local inventory list 116 is composed of the GUIDs of recordings currently available to the local client node 106. The sample schema uses a Simple Object Access Protocol (SOAP) request and response binding method in XML.

The list builder 318 may also include a metadata reader 322. In some instances the metadata includes EPG information, but the metadata can also include other information about the actual recording. In some implementations, the metadata can be used to drive remote applications that can remotely manage a recording, playback, or storage of the recording, allowing additional detail of the recording to be used or displayed. Metadata may also be employed to validate the recording, ensuring that the recording integrity has not been compromised. The metadata itself may be stored on both the multimedia server 104 and with the actual data of the recording on the removable storage device 102.

The metadata may be uploaded to a multimedia server 104 along with the local inventory list 116. In one implementation, a local inventory engine 114 uploads metadata associated with a local inventory list 116 to an Internet website associated with a multimedia server 104 via a URL such as MediaServiceNetwork.com (again, intended to be a fictional sample URL name). As above, some implementations the network scheduler 108 is an XML web service. One implementation uses an extensible markup language (XML) vehicle for the upload. Appendix B, for example, shows a sample schema for an upload of recording metadata to be reconciled with the inventory list 112 and/or a network store of metadata. The sample schema uses a Simple Object Access Protocol (SOAP) request and response binding method in XML.

FIG. 4 shows an exemplary network inventory engine 110 that maintains a network inventory list 112. The network inventory list 112 aims to encompasses recordings currently available on diverse removable storage devices 102 so that the exemplary network inventory engine 110 can make the updated inventory information available to entities on the network, such as the aforementioned network scheduler 108. An exemplary network inventory engine 110 may be implemented in software, hardware, or combinations of hardware, software, firmware, etc. The configuration of an exemplary network inventory engine 110 illustrated in FIG. 4 is only meant to be one example configuration.

The network inventory engine 110 may include a network configuration monitor 402 to provide the multimedia network 100 an awareness of client nodes 106 attached to the multimedia network 100. A media connection monitor 404, similar to the connection monitor 302 in the local inventory engine 114, may be included to provide the multimedia network 100 with awareness of removable storage devices 102 currently connected to client nodes 106 in the multimedia network 100.

A local inventory list reader 406 reads a list of currently available recordings built by a local inventory engine 114. In one implementation, the local inventory list reader 406 uploads a local inventory list 116 and related metadata as information stored in an XML vehicle, such as the sample schema described above with respect to the list builder 318 and shown below in Appendices A and B.

A digital rights manager 408 may be included to update digital rights management (DRM) information that may be present, for example, as part of the uploaded metadata. The digital rights manager 408 may direct the network inventory engine 110 to require authorization before disseminating newly available recordings to which digital rights requirements are attached to clients on the multimedia network 100. Thus, the digital rights manager 408 may track whether a particular client node 106 has the rights, encryption keys, etc., to receive, play back, or store a recording. Alternatively, the digital rights requirements attached to a secured recording that is newly available to the network 100 from a removable drive 102 of a client 106 can be updated and/or modified by the network 100 so that the secured recording can be disseminated freely to clients. But when playback of the secured recording is requested, the digital rights manager 408 checks for appropriate digital rights and if the client 106 does not have proper authorization, the client 106 may be offered an opportunity to procure or purchase a license.

A synchronizer 410 performs reconciliation between one or more local inventory lists 116 and the network inventory list 112. A synchronizer 410 may include a GUID reader 412 and a metadata reader 414 similar to those in a local inventory engine 114. The network inventory engine 110 compares the network inventory list 112 with uploaded local inventory lists 116 and determines which recordings are new, missing, etc.

In one implementation, logic used in the synchronization to compare the uploaded local inventory list 116 to the network inventory list 112 involves comparisons to determine which recordings exist in each list. The identities of recordings that exist only in the uploaded local inventory list 116 are incorporated into the network inventory list 112 as new recordings and the recordings that exist only in the network inventory list 112 may be marked unavailable.

Recordings that are no longer present are marked as unavailable instead of deleted, to allow some flexibility for how recurring recordings are handled—for example, periodic recordings of a television series. A user may choose to treat recordings marked as unavailable as deleted or archived, thus changing how a recurring recording mechanism handles the missing episodes of the series. Again, for recordings that are found to newly exist on a removable storage device 102, the assigned GUID and the associated metadata are uploaded to the multimedia server 104.

When a network inventory engine 110 receives a local inventory list 116 to be reconciled with the network inventory list 112, an update dialogue engine 416 included in the synchronizer 410 may request more information from the client node 106 or may request metadata associated with the recording. In other words, when the network inventory engine 110 determines that a recording is new to the network inventory list 112, the only information about the recording may be its GUID. The update dialogue engine 416 uses the GUID to find other information about the recording, such as its location and/or other metadata. Likewise, a network scheduler 108 may request more information about a recording from the network inventory engine 110, which in turn requests the information from the client node 106 via the update dialogue engine 416.

A marking engine 418 may also be included in the synchronizer 410 to designate whether a particular recording in the network inventory list 112 is available or unavailable.

A user interface generator 420 converts the network inventory list 112 into a serviceable user interface for each client node 106, while an update broadcaster 422 sends information from the updated network inventory list 112 to applications and nodes that use it, notably a network programming and/or recording scheduler 108.

Figure 5:
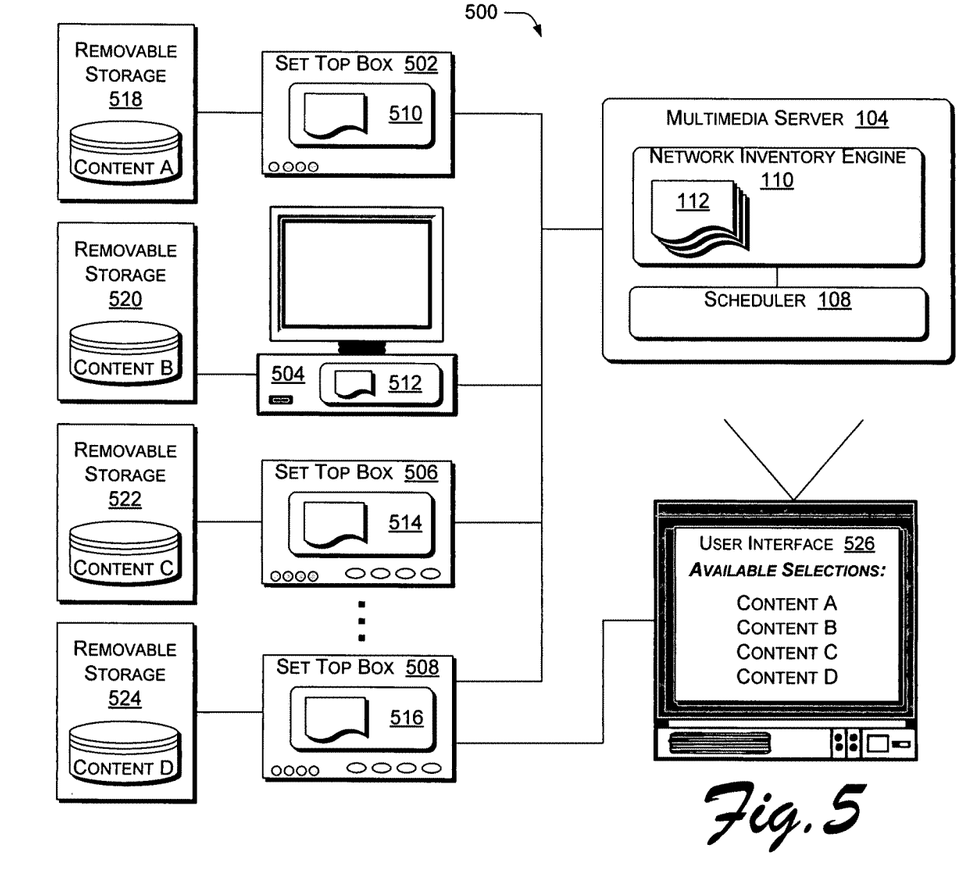
FIG. 5 is a graphic representation of an exemplary multimedia network in which a network scheduler allows recordings on a removable storage device to be accessed across the multimedia network.

FIG. 5 shows an exemplary multimedia network 500 for sharing and/or scheduling a recording that exists on a removable storage device, across multiple nodes of the multimedia network. The illustrated example configuration is only one arrangement for achieving the sharing, many other configurations are possible.

The exemplary multimedia network 500 consists of a multimedia server 104 communicatively coupled with multiple client nodes, such as set top boxes and one or more personal computing devices (i.e., 502, 504, 506, 508). The multimedia server 104 may include a network inventory engine 110 and a network inventory list 112 as well as a network scheduler 108. Each client node may include a respective local inventory engine (510, 512, 514, 516). Each client node may also be capable of connecting with one or more respective removable storage devices (518, 520, 522, 524).

Assuming that a digital rights manager 408 has determined that there are no restrictions upon sharing recording contents that exist on respective removable storage devices 518, 520, 522, 524, the recording content of a removable storage device may become instantly available to client nodes across the multimedia network 100. Hence, a given client node, such as set top box 508 may be able to access the content of all the removable storage devices currently connected to the multimedia network 500. If digital rights management is active, that is, if some of the recordings have restrictions upon their free dissemination, then clients may be guided toward acquiring a license. In another variation, a digital rights manager 408 has the ability to keep secured recordings private to a particular client or clients and not shared with unauthorized users on the network 100. In this case, secured recordings are flagged and only tied to a particular client or group of clients.

This expanded availability of recordings, even recordings on a removable storage device just recently connected to the multimedia network 500 for the first time, is depicted in a user interface 526 projected by one of the set top boxes 508. A user of the first set top box 508 can access content via the user interface 526 that is stored on a removable storage device 518 that is connected only to a second set top box 502. In other words, each set top box or personal computing device (510, 512, 514, 516) uploads a respective local inventory list 116 to the multimedia server 104 to be synchronized with the network inventory list 112. The network scheduler 108 then uses the up-to-date network inventory list 112 to produce a programming availability schedule (e.g., as shown in user interface 526) that can allow access to the content of all connected removable storage devices (518, 520, 522, 524) by any one of the client nodes (502, 504, 506, 508).

Exemplary Methods

An exemplary method of the subject matter includes detecting a change in a connection between a removable storage device and a multimedia network, and then updating a network inventory list of the recordings based on the change in connection.

Figure 6:
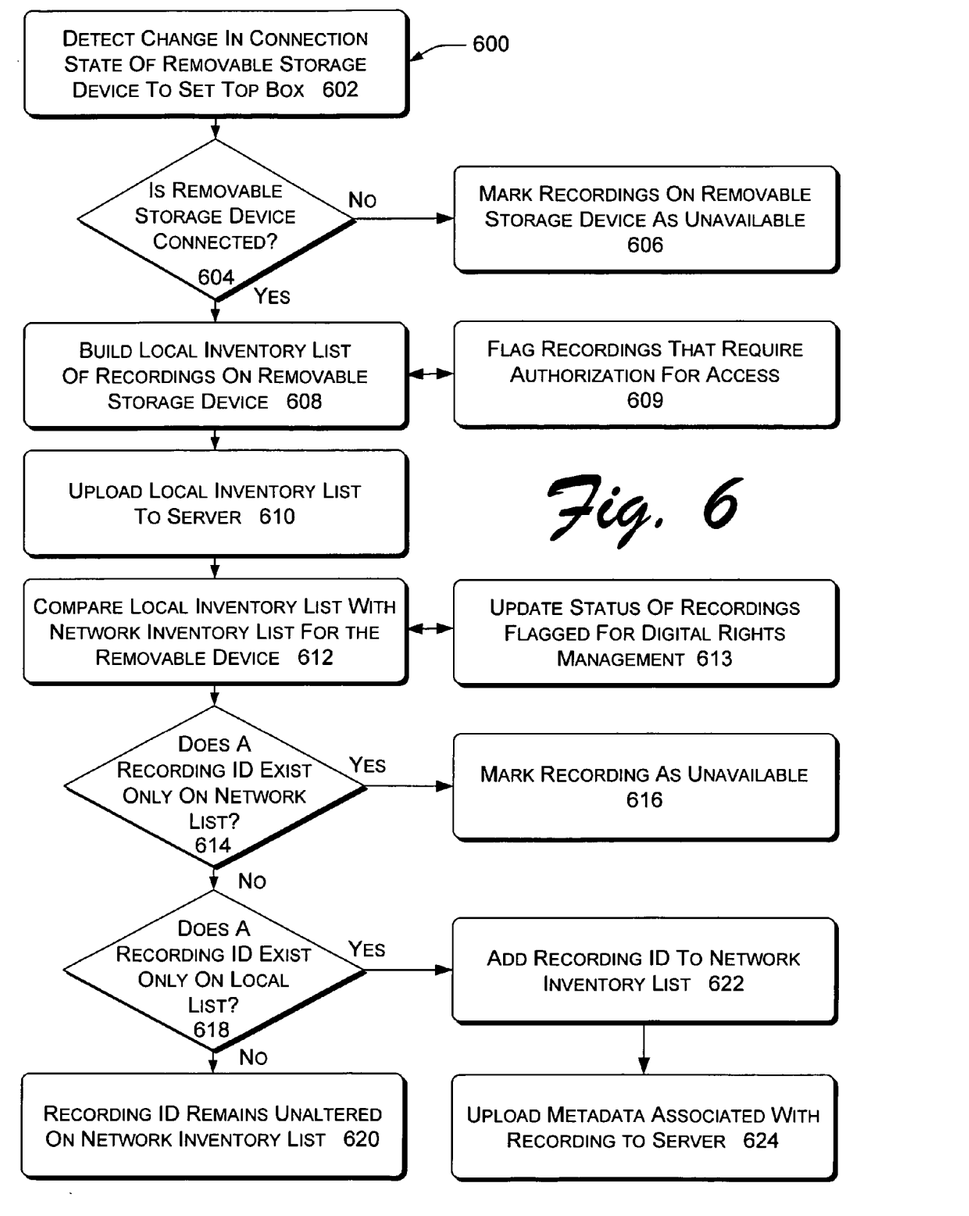
FIG. 6 is a flow diagram of an exemplary method of synchronizing contents of removable storage devices with a multimedia network.

As one of many examples of implementing the exemplary method just described, FIG. 6 shows a more detailed exemplary method 600 of synchronizing contents of removable storage devices with a multimedia network. In the flow diagram, the operations are summarized in individual blocks. The exemplary method 600 may be performed by hardware, software, or combinations of both, for example, by elements of an exemplary network inventory engine 110 and/or a local inventory engine 114.

At block 602, a change in a connection state of a removable storage device, e.g., a connection to a set top box of a multimedia network, is detected. A media connection monitor 302 may determine that a particular removable storage device 102 has been newly connected or disconnected to a set top box.

At block 604, the exemplary method 600 determines whether the removable storage device is connected to the set top box. If the removable storage device is not connected, then the exemplary method 600 branches to block 606, but if the removable storage device is connected, then the exemplary method 600 branches to block 608.

At block 606, recording IDs on a network inventory list that correspond to recordings on the disconnected storage device are marked as unavailable. A marking engine 418 of a network inventory engine 110 may keep track of the available/unavailable attribute so that availability of recordings may be displayed on a user interface for interaction with a user or transferred to applications, such as a network scheduler 108 that coordinates playback and recording of available multimedia content according to a time schedule.

At block 608, if the removable storage device is connected, the exemplary method 600 builds a local inventory list 116 of the recordings that currently exist on the connected storage device. A list builder 318 of a local inventory engine 114 may first check the physical and data integrity of a removable storage device 102 and then enlist a GUID reader 320 and a metadata reader 322 to build the local inventory list 116.

At block 609, recordings that are subject to digital rights management may be flagged for processing on a server 104 of the multimedia network 100. A local digital rights management engine 316 may detect an encrypted recording and in one implementation is capable of determining a level of authorization that a prospective client on the network 100 would be required to possess in order to access the secured recording. Recordings subject to DRM may also be flagged for access if a client purchases a license, that is, the recordings are flagged for a license purchase offer. In one implementation, the local DRM engine 316 includes decryption keys for secured recordings in metadata associated with the recordings. A network server 104 can then distribute the keys according to security rules or according to digital rights possessed by recipients.

At block 610, the local inventory list from block 608 is uploaded to a multimedia server. In some implementations of this exemplary method 600, the local inventory list 116 consists mostly of the GUIDs of recordings found on the removable storage device 102. This type of local inventory list 116 provides knowledge only of the existence or nonexistence of a recording on the removable storage device. In some implementations, the exemplary method 600 can also include an upload of metadata associated with each GUID.

At block 612, the local inventory list is compared with a network inventory list for the connected removable device.

A synchronizer 410 may compare the local inventory list 116 with the network list 112. The local inventory list 116 takes precedence over the network inventory list 112 in an accord or synchronization of the recording IDs on each list, as the local inventory list 116 has the most current and accurate information about which recordings actually exist on the removable storage device 102.

At block 613, recordings subject to DRM that were flagged at block 609, are integrated into the network 100. In one implementation, an authorization requirement—i.e., a DRM status—of each secured recording flagged at block 609 is checked and updated if necessary to function on the network 100. That is, the secured recording may be made available to all clients on the network 100, but flagged to be accompanied by an offer for unauthorized users to purchase an access license. Or, flagged recordings may be restricted to a certain number of copy or playback operations on the network 100. Likewise, flagged recordings may be restricted to a temporally limited availability period on the network 100.

At block 614, during the comparison at block 612, the exemplary method 600 determines if a recording ID exists only on the network inventory list. If yes, the exemplary method 600 branches to block 616, but if no, the exemplary method 600 branches to block 618.

At block 616, if the recording ID exists only on the network list, then the recording is marked as unavailable, since it does not exist on the removable storage device.

At block 618, the exemplary method 600 determines if the recording ID exists only on the local inventory list. If no, the exemplary method 600 branches to block 620, but if yes, the exemplary method 600 branches to block 622.

At block 620, since the recording ID of a recording on the removable storage device exists on both the local inventory list and the network inventory list, the recording ID remains unaltered on the network inventory list. It should be noted that in some implementations of an exemplary method 600, a mere change in the data content of a recording or in a single metadatum associated with a recording is sufficient to trigger an update of the network inventory list 112 according to the instant exemplary method 600.

At block 622, since the recording ID exists only on the local inventory list, the recording on the removable storage device is new to the multimedia network. An ID, e.g., a GUID, for the new recording on the removable storage device is added to the network inventory list.

At block 624, metadata associated with the new recording is uploaded to the multimedia server. The metadata may include electronic program guide (EPG) information, but may also include information relevant to the display of the multimedia content, or control information that can be used by an application that exerts remote management of the recording. The metadata may also include digital rights information that designates which clients can receive, playback, and/or store the recording.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes synchronizing contents of removable storage devices with a multimedia network. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX B

Sample Exemplary Schema to Upload Recording Metadata to be Reconciled with a Network Inventory List and/or a Network Store of Metadata, Using a Simple Object Access Protocol (SOAP) Request and Response Binding Method in Extensible Markup Language (XML).

```
POST /dvr/scheduler.asmx HTTP/1.1
Host: localhost
Content-Type: text/xml; charset=utf-8
Content-Length: length
SOAPAction: http://www.MediaNetworkService.com/UploadRecordingMetadata
<?xml version="1.0" encoding="utf-8"?>
<soap:Envelope     xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
   <soap:Body>
      <UploadRecordingMetadata xmlns="http://www.MediaServiceNetwork.com">
         <deviceId>guid</deviceId>
         <recordingId>guid</recordingId>
         <recordingMetadata>
            <Location>string</Location>
            <ByteSize>unsignedLong</ByteSize>
            <MetaData>
              <ActualStart>dateTime</ActualStart>
              <ActualEnd>dateTime</ActualEnd>
              <ActualDurationSec>unsignedInt</ActualDurationSec>
              <GuideMetaData>
                <EpgId>guid<EpgId>
                <Channel>unsignedInt</Channel>
```

-continued

```
            <ServiceId>guid</ServiceId>
            <ProgramId>guid</ProgramId>
            <SeriesId>guid</SeriesId>
            <EpisodeId>guid</EpisodeId>
            <Title>string</Title>
            <EpisodeTitle>string</EpisodeTitle>
            <Description>string</Description>
            <StarRating>string</StarRating>
            <Rating>string</Rating>
            <People>string</People>
            <Category>string</Category>
            <OriginalAir>dateTime</OriginalAir>
            <Start>dateTime</Start>
            <End>dateTime</End>
            <DurationSec>unsignedInt</DurationSec>
          </GuideMetaData>
        </MetaData>
        <BookMarkSec>unsignedInt</BookMarkSec>
      </recordingMetadata>
    </UploadRecordingMetadata>
  </soap:Body>
</soap:Envelope>
HTTP/1.1 200 OK
Content-Type: text/xml; charset=utf-8
Content-Length: length
<?xml version="1.0" encoding="utf-8"?>
<soap:Envelope        xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
  <soap:Body>
    <UploadRecordingMetadataResponse xmlns="http://www.MediaServiceNetwork.com>
/>
  </soap:Body>
</soap:Envelope>
```

What is claimed is:

1. A method comprising:

detecting, by a server connected to a multimedia network, a change in status of a connection between a removable storage device and a client computing node of the multimedia network;

receiving, by the server and from the client computing node, a local inventory list of recordings contained by the removable storage device;

comparing the local inventory list to a network inventory list of recordings to identify a recording on the local inventory list of recordings with which to update the network inventory list of recordings, wherein the network inventory list of recordings is associated with at least one or more other client computing nodes of the multimedia network; and updating, by the server and based at least in part on detecting the change in status, the network inventory list of recordings with information associated with the recording on the local inventory list of recordings identified based on the comparing.

2. The method as recited in claim 1, wherein the removable storage device connects to the multimedia network via the client computing node.

3. The method as recited in claim 1, further comprising:

detecting the recordings currently contained by the removable storage device;

prioritizing, by the server connected to the multimedia network, the local inventory list of recordings over the network inventory list of recordings; and performing the updating by synchronizing the network inventory list of recordings with the recordings detected, the updating based at least in part in part on the prioritizing.

4. The method as recited in claim 1, further comprising:

uploading the local inventory list of recordings from the client computing node of the multimedia network to the server; and maintaining a subscription media service on the server connected to the multimedia network.

5. The method as recited in claim 1, further comprising:

uploading the local inventory list of recordings from the client computing node of the multimedia network to the server;

maintaining a home media server on the server connected to the multimedia network.

6. The method as recited in claim 1, further comprising initiating the updating of the network inventory list of recordings in response to a change associated with the recording on the local inventory list of recordings identified based on the comparing.

7. The method as recited in claim 6, wherein the change comprises one of: a change in a content of the recording, a change in metadata of the recording, a change in an authorization level for accessing the recording, a change in a digital right associated with the recording, or a change in a presentation of a name of the recording on a user interface.

8. The method as recited in claim 1, wherein the updating the network inventory list of recordings includes updating metadata associated with the recording on the local inventory list of recordings identified based on the comparing.

9. The method as recited in claim 8, wherein the updating the metadata comprises updating digital rights associated with the recording on the local inventory list of recordings identified based on the comparing.

10. The method as recited in claim 8, wherein the updating the metadata comprises including a decryption key in the metadata for distribution to a recipient of the recording on the local inventory list of recordings identified based on the comparing.

11. The method as recited in claim 8, wherein a copy of the metadata is stored on the multimedia network apart from the removable storage device.

12. The method as recited in claim 8, wherein the metadata includes electronic program guide information.

13. The method as recited in claim 1, wherein the change in status comprises a change from a disconnection state to a connection state between the removable storage device and the client computing node of the multimedia network.

14. The method as recited in claim 1, wherein the change in status comprises a change from a connection state to a disconnection state between the removable storage device and the client computing node of the multimedia network and the updating includes marking the recordings in the network inventory list as unavailable based on the change in status.

15. The method as recited in claim 1, wherein the change in status comprises a change from a disconnection state to a connection state between the removable storage device and the client computing node of the multimedia network and the updating includes marking the recordings in the network inventory list as available based on the change in status.

16. The method as recited in claim 1, wherein the updating includes flagging recordings subject to digital rights management.

17. The method as recited in claim 16, further comprising offering an opportunity to purchase a license for accessing a flagged recording.

18. The method as recited in claim 1, further comprising sharing a recording contained by the removable storage device with at least one of the one or more other client computing nodes of the multimedia network, wherein the sharing comprises making the recording available for playback and storage on the at least one other client computing node.

19. The method as recited in claim 18, further comprising checking an authorization level of the at least one other client computing node before sharing a secured recording subject to digital rights management.

20. The method as recited in claim 19, further comprising hiding an identity of the secured recording from the at least one other client computing node if the at least one other client computing node lacks a sufficient authorization level to access the secured recording.

21. The method as recited in claim 19, further comprising offering a purchase of a license for accessing the secured recording to a user of the multimedia network.

22. The method as recited in claim 1, further comprising modifying a schedule of the multimedia network based at least in part on the updating, wherein the schedule comprises one of a digital video recording schedule, a digital video playback schedule, or a digital video channel guide schedule.

23. A system, comprising:
one or more processors;
one or more memory devices;
instructions, stored on the one or more memory devices and that, when executed on the one or more processors, cause the one or more processors to perform operations comprising:
detecting a change in a connection status between a removable storage device and a client computing device of a multimedia network;
receiving a local inventory list of recordings contained by the removable storage device; and
comparing the local inventory list to a network inventory list of recordings to determine one or more of:
a first recording included in the local inventory list and not included in the network inventory list; or
a second recording included in the network inventory list and not included in the local inventory list; and
updating the network inventory list of recordings based at least in part on information associated with one or more of the first recording or the second recording.

24. The system as recited in claim 23, wherein the operations further comprise scheduling available recordings for playback and storage on the multimedia network based on the update of the network inventory list of recordings.

25. The system as recited in claim 23, wherein the operations further comprise marking the second recording as unavailable.

26. The system as recited in claim 23, wherein the operations further comprise tracking a recording and associated metadata using a GUID globally unique identifier.

27. The system as recited in claim 23, wherein the operations further comprise receiving metadata associated with the first recording, wherein the metadata include decryption information to decrypt the first recording.

28. A method comprising:
detecting, at a multimedia hub, a change in a connection between a removable storage device and a client node on a multimedia network;
receiving, at the multimedia hub from the client node, a local inventory list of recordings contained by the removable storage device;
comparing the local inventory list to a network list of recordings, wherein the network list of recordings includes recordings stored on a plurality of different removable storage devices associated with a plurality of different client nodes;
updating, at the multimedia hub and based on the comparing, the network list of recordings for the multimedia network based on the local inventory list to reflect an availability of each recording in the network list; and
in response to the updating, modifying a network programming guide to include available recordings based on currently connected removable storage devices and to exclude unavailable recordings based on currently disconnected removable storage devices.

* * * * *